(12) United States Patent
Zloter et al.

(10) Patent No.: US 6,392,330 B1
(45) Date of Patent: May 21, 2002

(54) CYLINDRICAL ULTRASOUND RECEIVERS AND TRANSCEIVERS FORMED FROM PIEZOELECTRIC FILM

(75) Inventors: Yitzhak Zloter, Holon; Gideon Shenholz, Tel Aviv, both of (IL)

(73) Assignee: Pegasus Technologies Ltd., Azoor (IL)

( * ) Notice: Subject to any disclaimer, the term of this patent is extended or adjusted under 35 U.S.C. 154(b) by 0 days.

(21) Appl. No.: 09/586,889

(22) Filed: Jun. 5, 2000

(51) Int. Cl.[7] ............................................. H01L 41/08
(52) U.S. Cl. ...................... 310/334; 310/366; 310/800
(58) Field of Search .................. 310/334–337, 310/800, 346, 366, 369

(56) References Cited

U.S. PATENT DOCUMENTS

| | | | |
|---|---|---|---|
| 3,816,774 A | * 6/1974 | Ohnuki et al. | 310/800 X |
| 3,978,353 A | * 8/1976 | Kinoshita | 310/366 |
| 4,170,742 A | * 10/1979 | Itagaki et al. | 310/800 X |
| 4,706,681 A | 11/1987 | Breyer et al. | |
| 4,757,821 A | 7/1988 | Snyder | |
| 4,758,691 A | 7/1988 | De Bruyne | |
| 4,825,116 A | * 4/1989 | Itoh et al. | 310/335 |
| 4,906,886 A | 3/1990 | Breimesser et al. | |
| 5,323,082 A | * 6/1994 | Wright | 310/328 |
| 5,339,290 A | 8/1994 | Greenstein | |
| 5,384,029 A | 1/1995 | Campbell | |
| 6,239,535 B1 | * 5/2001 | Toda et al. | 310/334 |

* cited by examiner

*Primary Examiner*—Mark O. Budd
(74) *Attorney, Agent, or Firm*—Mark M. Friedman (57) ABSTRACT

An ultrasound receiver includes a hollow cylinder formed primarily from flexible piezoeelectric film, the hollow cylinder having an outer surface, an inner surface, a central axis and a height measured parallel to the central axis. A sensing electrode is formed from conductive material applied to the inner surface, while a grounded electrode is formed from conductive material applied to the outer surface. The hollow cylinder is supported by a support structure configured to allow progagation of vibration waves circumferentially around a major part of the hollow cylinder. The sensing electrode is formed as a strip extending in an extensional direction substantially parallel to the central axis along a major part of the height, the strip subtending at the central axis an angle of not more than 90°.

18 Claims, 11 Drawing Sheets

CYLINDRICAL ULTRASOUND RECEIVERS AND TRANSCEIVERS FORMED FROM PIEZOELECTRIC FILM

FIELD AND BACKGROUND OF THE INVENTION

The present invention relates to ultrasound transducers and, in particular, it concerns cylindrical ultrasound receivers and transceivers formed from piezoelectric films, and their applications in digitizer systems.

It is known to employ cylindrical ultrasound transducers for transmitting ultrasound signals in digitizer systems. The cylindrical form provides all-around signal transmission and simplifies the geometry of time-of-flight calculations by providing an effect similar to a point (or more accurately, line) source. These advantages are detailed in U.S. Pat. No. 4,758,691 to De Bruyne. A further advantage of cynlindrical ultrasound transducers is that they can be centered around an element of which the position is to be measured. This is used in a drawing implement digitizer system described in PCT publication WO98/40838.

Structurally, a number of different types of cylindrical transducer have been proposed. the De Bruyne patent proposes a "Sell transducer" which is capacitive device formed from a complicated arrangement of cylindrical layers intended to produce a cylindrical air gap of about 20 $\mu$m. Such a structure is costly to manufacture, and is likely to be unreliable.

A second type of transducer which has been proposed in the field of medical applications is based on piezoelectric elements. An example of a medical transducer of this type may be found in U.S. Pat. No. 4,706,681 to Breyer et al. which discloses an ultrasonic marker. Here, a cylindrical piezoelectric collar is sandwiched between two electrodes. Application of an alternating potenial across the electrodes causes vibration of the collar, and hence emits a radially propagating ultrasonic signal.

In principle, any ultrasonic transducer is capable of being operated both as a transmitter and a receiver. In practice, however, many considerations result in many transmitter structures being ineffective as receivers. This is particurlarly true of cylindrical elements in which almost the entire cylinder contributes to wide angle transmission by actuation with a relatively high power while only a small portion of the cylinder is correctly oriented for receiving an incoming signal from a given direction. Furthermore, the inherent capacitance of the large inactive region of the transducer may absorb a large proportion of the amplitude of a received signal, rendering the transducer insensitive as a receiver.

In the field of transducers in general, much work has been invested in development of devices based on piezoelectric films, such as PVDF. Conductive electrodes are formed on opposite faces of the film, typically by selectively printing conductive ink on regions of the surfaces. These films are cheap to produce, and withstand a wide range of operating conditions including exposure to moisture.

Figure 1:
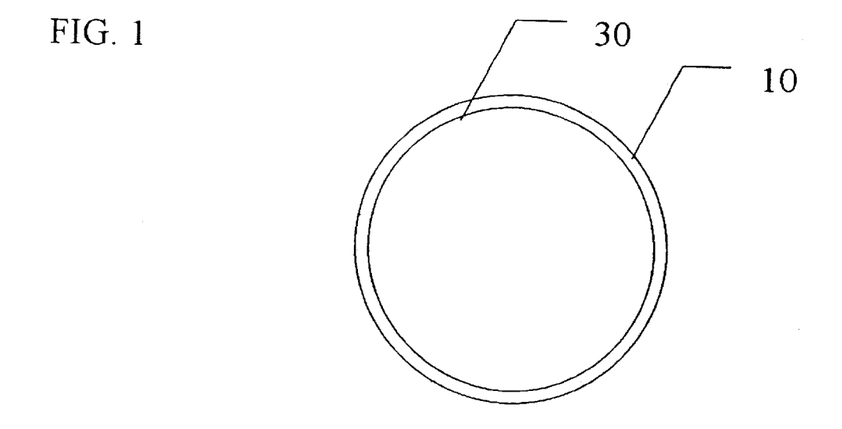
FIG. 1 is a schematic plan view of a freely suspended cylinder formed from piezoelectric film in its relaxed state.
Figure 2:
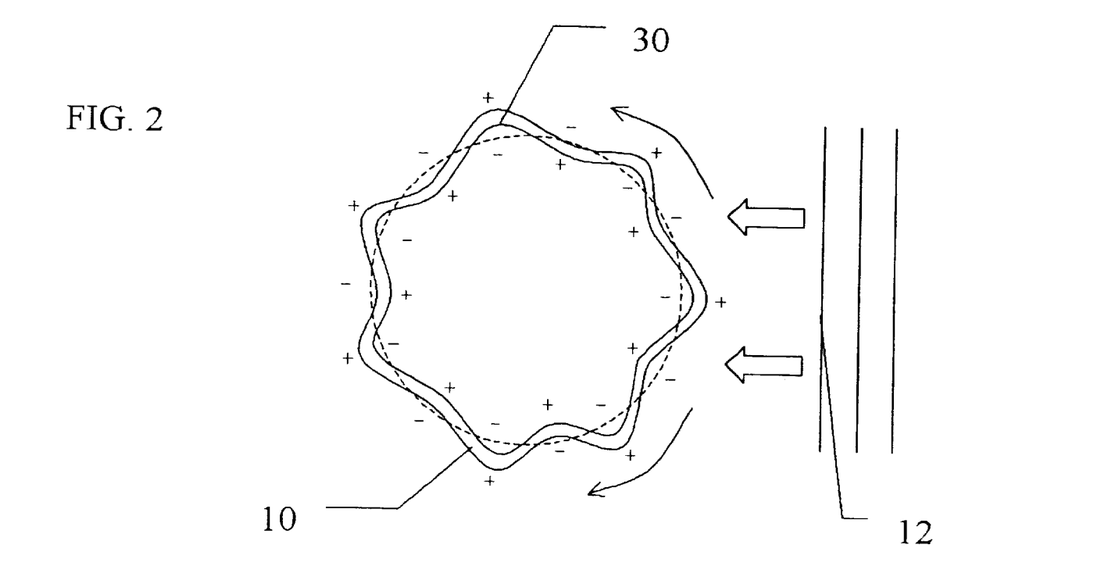
FIG. 2 is a schematic view of the cylinder of FIG. 1 when exposed to an ultrasonic signal.

Although a cylindrical ultrasound transducer is relatively simple to implement using piezoelectric film, implementation of a receiver poses additional problems beyond the general complications of cylindrical receivers discussed above. Specifically, referring to FIGS. 1 and 2, there is shown a schematic plan view of a freely suspended cylinder 10 formed from piezoelectric film. FIG. 1 shows its relaxed state, while FIG. 2 shows the response of cylinder 10 to an incoming ultrasound signal wave front 12. Since the piezoeletric film is flexible, the oscillations of signal 12 generate waves (exaggerated for clarity) traveling around cylinder 10. The direction and extent of flexing of the piezoelectric film varies along the wave form created around the cylinder, resulting in reversal of the sense of an electrical potential generated between the electrodes. As a result, much of the potential generated by the piezoelectric film may be dissipated in local eddy currents within the electrodes, greatly reducing the overall signal voltage as measured between the electrodes.

A further problem of implementing a cylindrical ultrasound transducer using pieoelectric film is the tendency for the electrode to act as an antenna picking up unwanted electromagnetic radiation which may result in very low signal to noise ratios.

There is therefore a need for a cylindrical ultrasound receiver structure employing pieoelectric film.

SUMMARY OF THE INVENTION

The present invention is a cylindrical ultrasound receiver structure employing pieoelectric film.

According to the teachings of the present invetnion there is provided, an ultrasound receiver comprising: (a) a hollow cylinder formed primarily from flexible pieoelectric film, the hollow cylinder having an outer surface, an inner surface, a central axis and a height measured parallel to the central axis; (b) a sensing electrode formed from conductive material applied to the inner surface; (c) a grounded electrode formed from conductive material applied to the outer surface; and (d) a support structure for supporting the hollow cylinder, the support structure being configured to support the hollow cylinder in such a manner as to allow propagation of vibration waves circumferentially around a major part of the hollow cylinder, wherein the sensing electrode is formed as a strip extending in an extensional direction substantially parallel to the central axis along a major part of the height, the strip subtending at the central axis an angle of not more than 90°.

According to a further feature of the present invention, the strips subtends at the central axis an angle of not more than 30°.

According to a further feature of the present invention, the grounded electrode extends over a major part of the outer surface.

According to a further feature of the present invention, there is also provided at least one additional electrode formed conductive material applied to the inner surface in pattern non-contiguous with the sensing electrode.

According to a further feature of the present invention, the at least one additional electrode extends over a major part of the inner surface.

According to a further feature of the present invention, the at least one additional electrode is grounded.

According to a further feature of the present invention, configured for use additionally as an ultrasound transmitter, thereby serving as an ultrasound transceiver, the ultrasound transceiver further comprises a control module including: (a) receiver circuitry electrically connected to the sensing electrode; (b) transmitter circuitry; and (c) a switching system associated with an actuating electrode selected from the grounded electrode and the additional electrode and configured to alternately electrically connect the actuating electrode to the transmitter circuitry and to ground.

According to a further feature of the present invention, the support structure includes a conductive core element deployed within the hollow cylinder in such a manner as to avoid electrical contact with the sensing electrode, the conductive core element being electrically grounded. According to one preferred implementation, the conductive core element is a metal core element. According to an alternative omplementation, the conductive core element is formed from conductive foam.

According to a further feature of the present invention, the flexible piezoelectric film is implemented as PVDF film. p According to a further feature of the present invention, the sensing electrode and the grounded electrode are implemented as substantially transparent electrodes.

There is also provided according to the teachings of the present invention, a method for operating an ultrasound transceiver for receiving and transmitting ultrasound signals, the method comprising the steps of: (a) providing an ultrasound transceiver structure including: (i) a hollow cylinder formed primarily from flexible piezoelectric film, the hollow cylinder having an outer surface, an inner surface, a central axis and a height measured parallel to the central axis, the hollow cylinder being mounted so as to allow propagation of vibration waves circumferentially around a major part of the hollow cylinder, (ii) a sensing electrode formed from conductive material applied to the inner surface, the sensing electrode being formed as a narrow strip extending in an extensional direction substantially parallel to the central axis along a major part of the height, the strip subtending at the axis an angle of not more than 90°, (iii) at least one additional inner electrode formed from conductive material applied so as to extend over a major part of the inner surface in a pattern non-contiguous with the sensing electrode, and (iv) at least one outer electrode formed from conductive material applied so as to extend over a major part of the outer surface; (b) receiving ultrasound signals by: (i) connecting both the additional inner electrode and the outer electrode to ground, and (ii) electrically connecting the sensing electrode to receiver circuitry; and (c) transmitting ultrasound signals by applying a driving voltage to at least one of the additional inner electrode and the outer electrode.

There is also provided according to the teachings of the present invention, a method for operating a system for determining the position of a movable element, the system including a first group of movable ultrasound transducer including al least one ultrasound trandsducer associated with a movable element and a second group of fixed ultrasound transducers including at least two ultrasound transducers maintained in fixed geometrical relation by attachment to a base unit, the method for operating including: (a) operating the system in a measurement mode in which: (i) one of the first and second groups of ultrasound tranducers trnasmits at least one measurement signal which is received by ultrasound transducers in the other of the first and second groups, and (ii) a position of the movable element is derived from time-of-flight measurements for the at least one measurement signal; and (b) intermittently operating the system in a calibration mode in which: (i) at least one ultrasound transducer from the second group transmits a calibration signal and at least one other ultrasound transducer from the second group receives the calibration signal, and (ii) calibration information is derived from time-of-flight measurements for calibration signal.

According to a further feature of the present invention, at least one ultrasound transducer from the second group is implemented as the aforementioned cylindrical ultrasound transducer structure.

There is also provided according to the teachings of the present invention, a method for providing mechanical protection for an ultrasound transducer used for a given frequency of ultrasound signals while minimizing interference with the ultrasound signals, the method comprising positioning a protective grating adjacent to the transducer, the grating having plurality of openings spaced at a spatial frequency of less than about half, and preferably less than about a quarter, of the wavelength of the given frequency of ultrasound in air. For a cylindrical transducer, the grating is preferably configured as a cylindrical grating surrounding the transducer.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a cylindrical ultrasound receiver or transceiver formed from piezoelectirc films. The invention also provides applications of such transceivers in digitizer systems.

The principles and operation of receivers and transceivers according to the present invention may be better understood with reference to the drawings and the accompanying description.

Referring now to the drawings, FIGS. 3–11 illustrate various aspects of an ultrasound receiver, generally designated 20, and its associated assembly, constructed and operative according to the teachings of the present invention.

Figure 3:
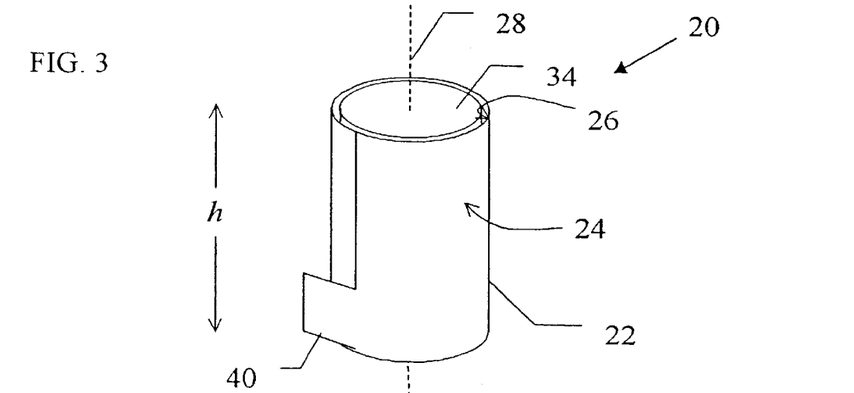
FIG. 3 is an isometric view of a cylindrical ultrasound transceiver, constructed and operative according to the teachings of the present invention.

Generally speaking, receiver 20 includes a hollow cylinder 22, formed primarilty from flexible piezoelectric film, having an outer surface 24, an inner surface 26, a central axis 28 and a height h measured parallel to axis 28. Applied to inner surface 26 is a sensing electrode 30 formed from conductive material. A grounded electrode 32 is formed from conductive material applied to the outer surface 24. Cylinder 22 is supported by a support structure, represented here by a core element 34, configured to support the hollow cylinder in such a manner as to allow propagation of vibration waves circumferentially around a major part of cylinder 22.

Figure 4A:
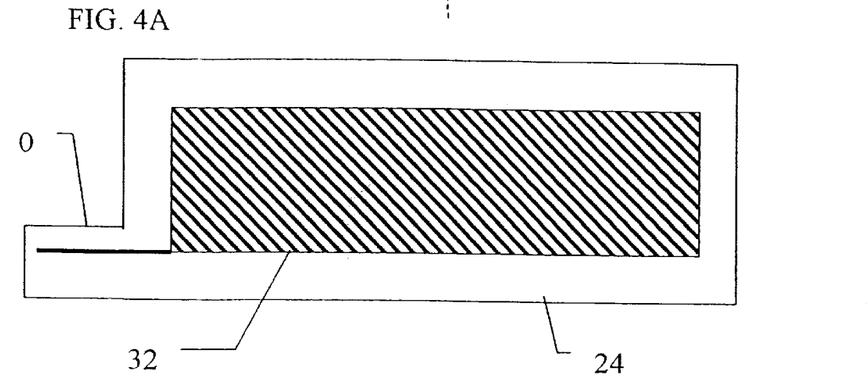
FIGS. 4A and 4B are plan views of the outer and inner surfaces, respectively, of a piezoelectric film employed in the cylindrical ultrasound transceiver of FIG. 1, showing the form of electrode patterns applied to each surface.
Figure 4B:
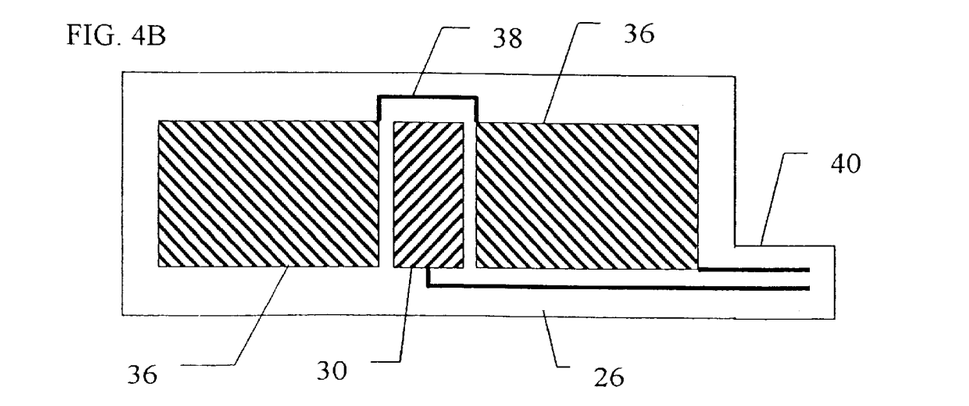
Figure 4C:
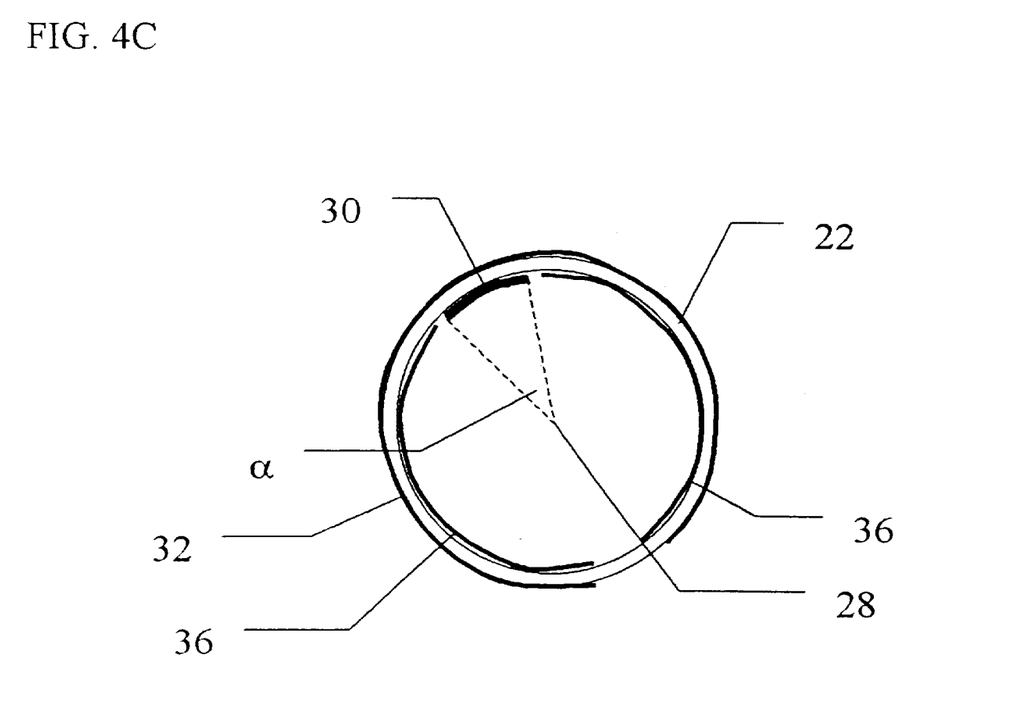
FIG. 4C is a schematic plan view of the film of FIGS. 4A and 4B in its cylindrical configuration.

It is a particular feature of most preferred implementations of the present invention that sensing electrode 30 is formed as a strip extending in an extentional direction substantially parallel to central axis 28 along a major part of height h and subtending at central axis 28 an angle α of not more than 90° (see FIG. 4C). The dimension of strip 30 is preferably chosen such that it corresponds to less than about ¼ wavelength of the vibrations in cylinder 22 induced by ultrasound vibrations of the intended working frequency. In most cases, the dimensions are chosen such that cylinder 22 supports only about 1 wavelength of the vibrations (rather than the about three wavelengths illustrated schematically in FIG. 2) so as to minimize interference effects and the like. As a result, phase canceling problems can largely be avoided so long as strip 30 subtends an angle α of less than 90° at axis 28. Preferably, however, the width of strip 30 is typically chosen to subtend an angle α of between about 20 and 30° at axis 28.

The principal of operation of receiver 20 may be appreciated by referring back FIGS. 1 and 2. As described above, incident pressure waves tend to induce vibration waves which propagate around the periphery of the cylinder. As a result, an arbitrarily positioned localized sensor on the surface of the cylinder experiences substantially the same vibrations substantially independent of the direction from which the pressure waves are incident. At the same time, since the circumferential extent of sensing electrode 30 is small relative to the wavelength of the vibrations propagation through the film, the aforementioned problems of phase canceling and large capacitance are avoided. The result is a highly effective, wide angle ultrasound receiver. These and other advantages of the configuration of the present invention will become clearer from the following more detailed description.

With regard to materials, it should be noted that the present invention may be implemented using any piezoelectric film material and suitable conductive electrode material. A particularly preferred example for the film itself is PVDF. The direction of polarization should be oriented circumferemtially around the cylinder. The use of such films provides particular advantages due to its wide frequency-band response. Specifically, it has been found that conventional narrow frequency-band receivers based on piezoceramics tend to shift signal noise into the frequency range of measurement, drastically reducing the signal-to-noise ratio. In contrast, the wide frequency-band receivers of the present invention, used in combination with subsquent filtering to indentify the signal of interest, have been found to provide a greatly enhanced signal-to-noise ratio.

Suitable conductive materials for the electrodes include, but are not limited to, compositions containing carbon, silver and gold. In applications in which a transparent structure is required, a transparent conductive material is used.

As mentioned easrlier, one major problem associated with implementation of a cylindrical ultrasound transducer using pieozelectric film is the tendency of the electrodes to function as an antenna for electromagnetic (EM) radiation. To minimize or eliminate this problem, preferred implementations of the present invention include one or more features which help shield sensing electrode 30 from EM radiation, as will now be detailed.

Firstly, grounded electrode 32 preferably extends over a major part of outer surface 24 of the film. This forms a conductive shell around sensing electrode 30, thereby tending to exclude EM fileds from the contained volume. This, incidentally, is the reason it is preferred to position sensing electrode 30 on the inner surface of the film rather than externally thereto.

Additional shielding is preferably offered by providing at least one additional grounded electrode 36 formed from conductive material applied to the inner surface in a pattern non-contiguous with the sensing electrode. Preferably, additional electrode 36 extends over a major part of inner surface 26. Where two or more separate regions are required, they may advantageously be electrically connected by a bridge portion 38 of the conductive material, such as is shown in FIG. 4B.

A further or alternative contribution to EM shielding is preferably provided by employing an electrically grounded conductive core element 34 disposed within cylinder 22 in such a manner as to avoid electrical contact with sensing electrode 30. Core element 34 is typically, although not necessarily, part of the support structure for cylinder 22.

Figure 5:
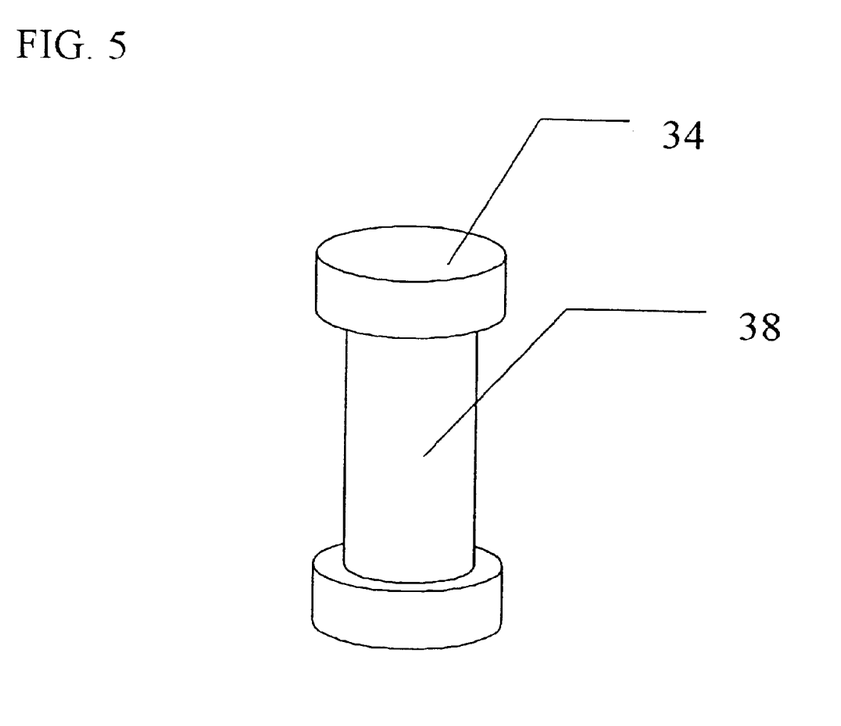
FIG. 5 is a isomatic view of metallic core element from the cylindrical ultrasound transceiver of FIG. 1.

FIG. 5 shows one preferred implementation of core element 34 as a metal core element, which may be solid as shown or hollow. In order to ensure that the film cylinder 22 is free to vibrate, core element 34 is here formed with a reduced diameter portion 38 over a major part of its height. In certain cases, the non-contact regions defined by reduced diameter portion 34 may be sufficient to avoid electrical contact with sensing electrode 30. Alternatively, an additional insulating layer may be interposed between core element 34 and sensing electrode 30.

Figure 6:
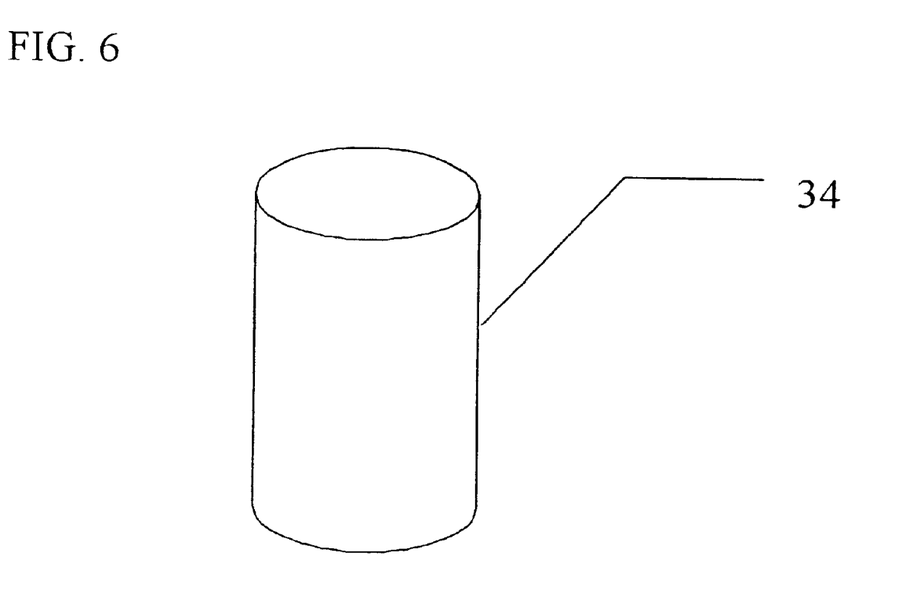
FIG. 6 is an isomatic view of a conductive foam core element which may be used as an alternative to the core element of FIG. 5.

FIG. 6 shows an alternative implementation of core element 34 formed from conductive foam. in this case, contact between core element 34 and cylinder 22 typically does not significantly interfere with propagation of vibrations within cylinder 22. In this case, an additional insulating layer is generally required between core element 34 and sensing electrode 30.

In order to make use of receiver 20, appropriate electrical connections must clearly be made between the various electrodes and the appropriate electrical components of the associated circuitry (to be addressed below). It is noted that a wide range of effective connection configurations are known in the art of piezoelectric device design. For completeness, however, brief reference will be made to a number of connection configurations which are believed to be particurarly advantageous.

Firstly, with reference to FIGS. 3, 4A and 4B, it is noted that a preferred form cylinder 22 is configured such that a tab 40, carrying all the electrical contacts, projects therefrom. Three techniques for connecting these contacts to corresponding contacts of a PCB are illustrated in FIGS. 7A–7B, FIG. 8 and FIG. 9, respectively.

Figure 7A:
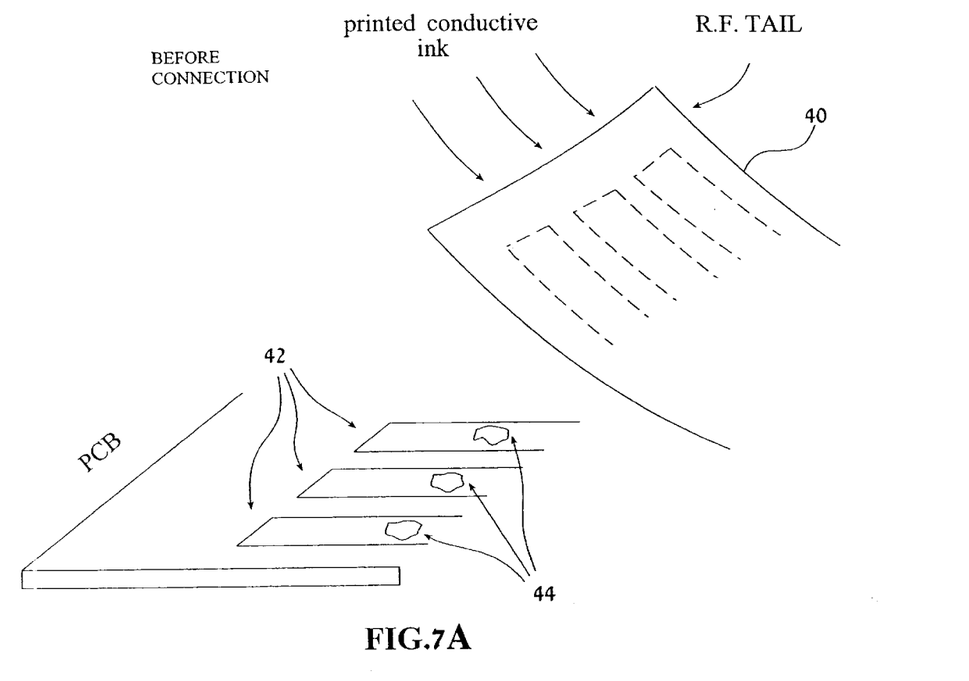
FIGS. 7A and 7B are schematic isomatic views illustrating a first technique for forming electrical contacts with the cylindrical ultrasound transceiver of FIG. 1, employing conductive adhesive.
Figure 7B:
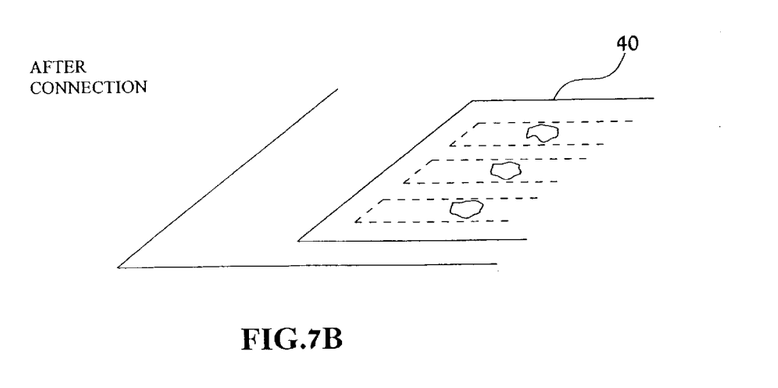

According to the technique of FIGS. 7A and 7B, tab 40 is aligned with, and pressed against, the corresponding contacts 42 of the PCB which have been prepared by depositing a drop of a conductive glue 44 on each.

Figure 8:
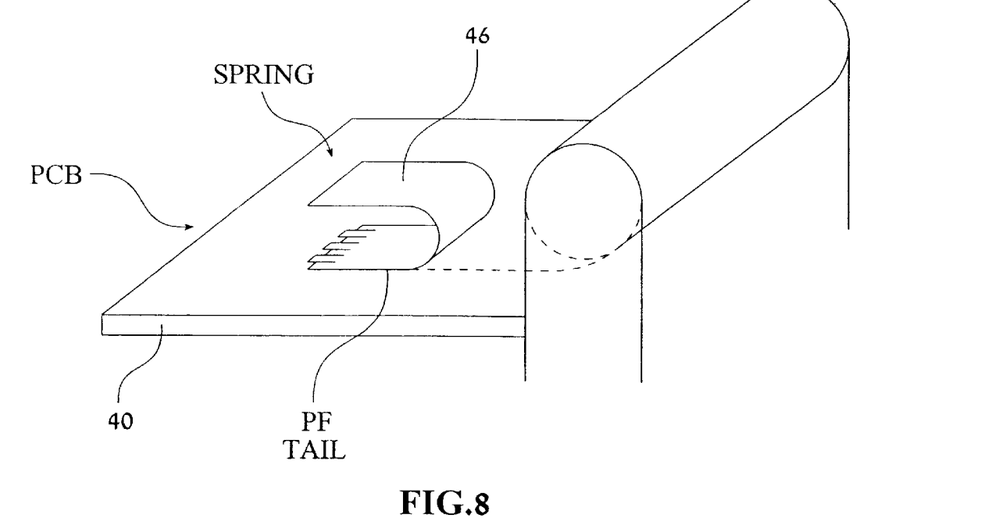
FIG. 8 is a schematic isomatic view of illustrating a second technique for forming electrical contacts with the cylindrical ultrasound transceiver of FIG. 1, employing spring connections.

According to the technique of FIG. 8, tab 40 is forced between the PCB and one or more spring element 46. Electrical contacts are provided on one, or typically both, of the PCB and the spring.

Figure 9:
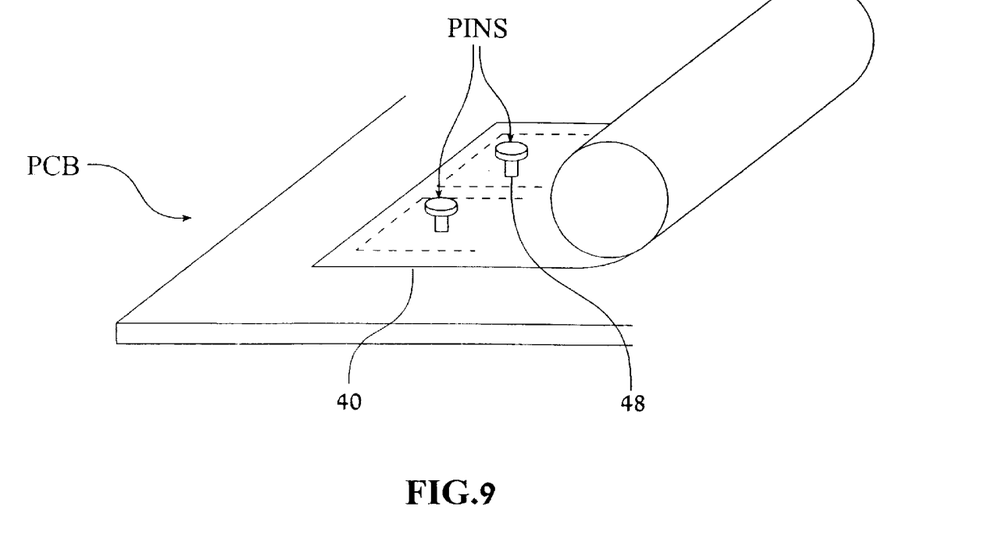
FIG. 9 is a schematic isomatic view illustrating a third technique for forming electrical contacts with the cylindrical ultrasound transceiver fo FIG. 1, employing pins.

According to the technique of FIG. 9, a number of conductive pins 48 are inserted through the contact portions of tab 40 and engage corresponding contact sockets on the PCB.

Figure 10A:
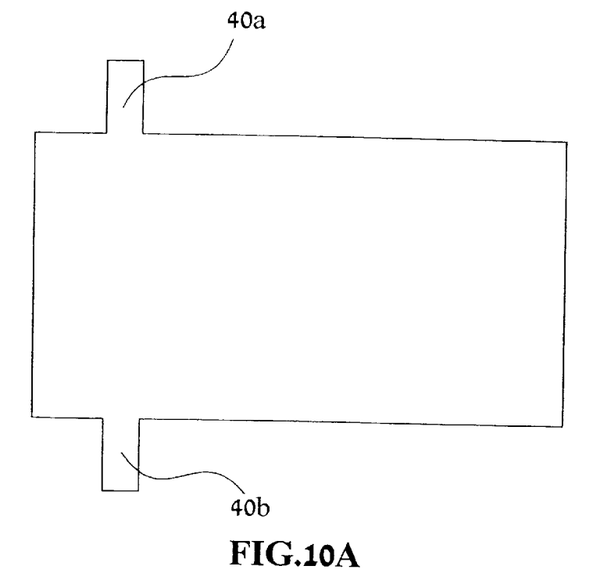
FIG. 10A is a schematic plan view of a piezoelectric film for use in the cylindrical ultrasound transceiver of FIG. 1, showing an alternative configuration of connections tabs.
Figure 10B:
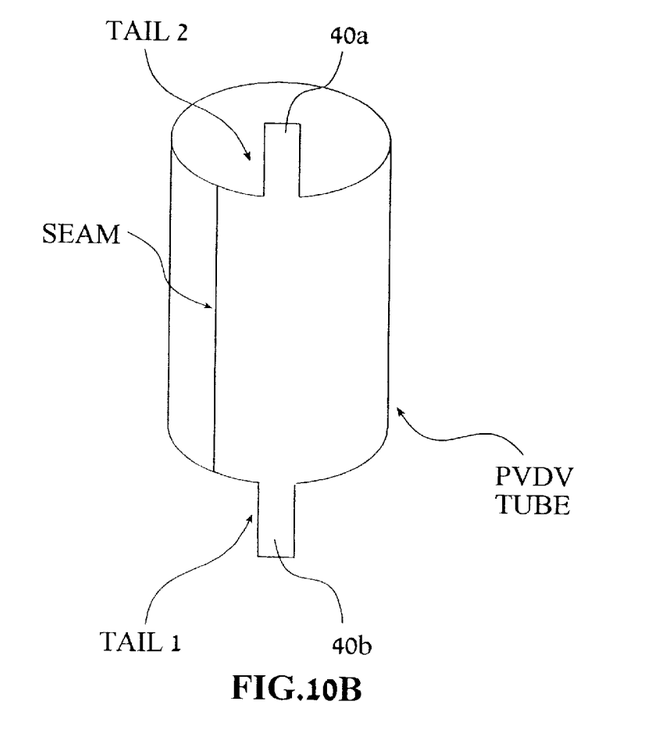
FIG. 10B is a schematic isomatic view showing the film of FIG. 10A rolled into its cylindrical form.

Turning briefly to FIGS. 10A and 10B, there is shown an alternative configuration of the piezoelectric film in which contact tabs 40a and 40b extend axially from cylinder 22 rather than tangentially. In other respects, this configuration is fully analogous to that of FIGS. 3–4.

Although device 20 has been described thus far as an ultrasound receiver, the same structure is highly suited for use in a transceiver system, i.e., for both receiving and transmitting signals, as will now be described. Referring back to FIG. 4B, it will be noted that additional electrode(s) 36 preferably cover a large proportion of surface 26 opposite grounded electrode 32. Thus, a driving potential applied between these two electrodes is highly effective to generate an unltrasound signal, similar to the operation of a conventional cylindrical ultrasound transmitter.

As mentioned earlier, it is advantageous that both grounded electrode 32 and additional electrode(s) 36 are grounded for shielding purposes during reception of ultrasound signals. In order to maintain this advantage, a switching system may be used to selectively switch connection of one of the grounded electrodes to transmitter circuitry when transmission is required.

Figure 11:
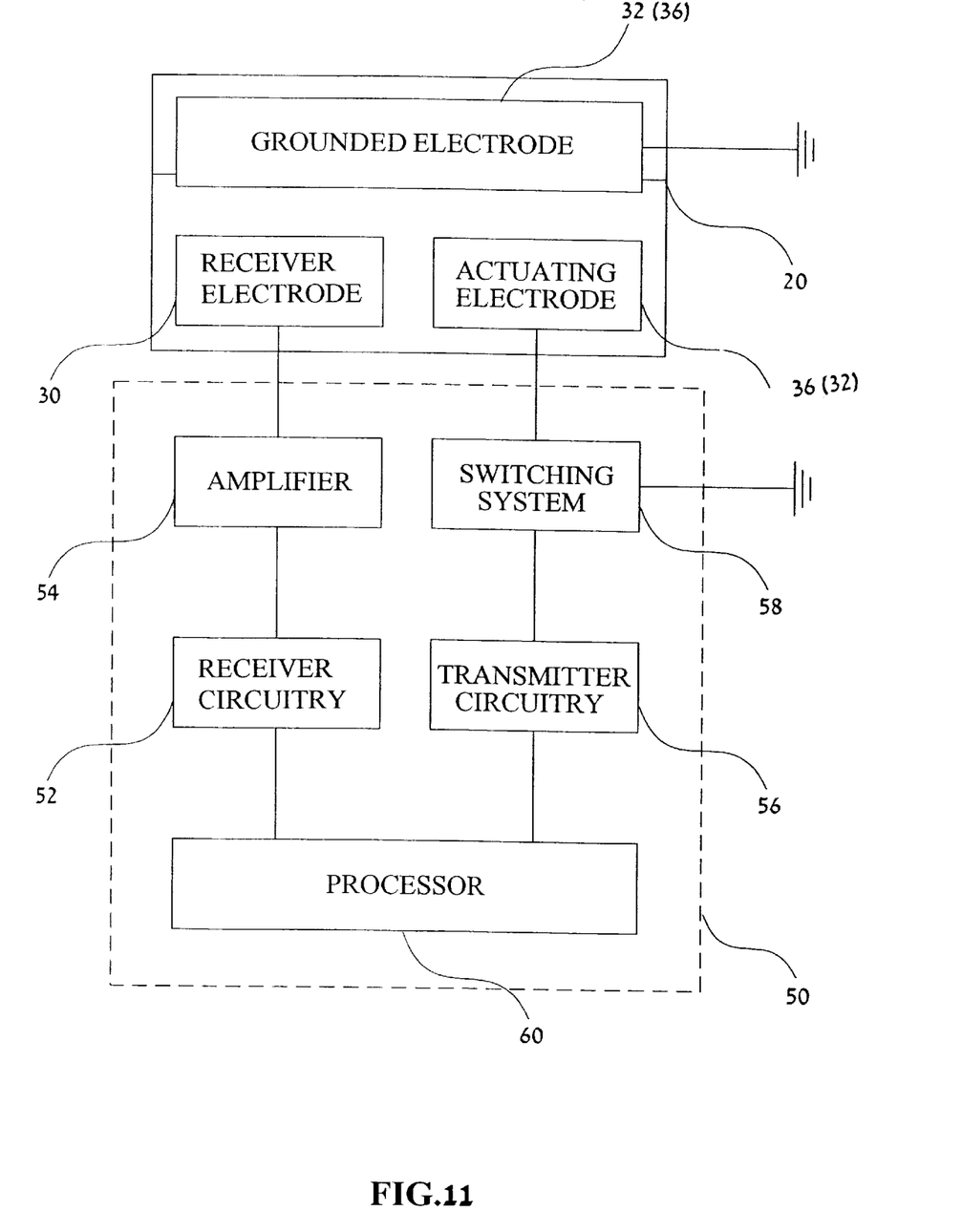
FIG. 11 is a block diagram illustrating the main components of a transceiver assembly including the cylindrical ultrasound transceiver of FIG. 1.

Thus, referring to FIG. 11, there is shown a representation of a transceiver assembly employing device 20. The transceiver assembly further includes a control module 50 having receiver circuitry 52 electrically connected to sensing electrode 30, typically via an amplifier 54. Control module 50 also includes tranmitter circuitry 56, and a switching system 58. Switching system 58 is associated with either grounded electrode 32 or additional electrode 36 which serves as an actuating electrode, alternately connecting it to the transmitter circuitry for transmission and to ground during reception. The entire assembly is typically operated under control of a processor 60, details of which are not essential to the present invention.

In operation, when the assembly is being used for reception, both additional electrode 36 and outer electrode 32 are connected to ground, thereby offering the maximum available EM shielding. When transmission is required, a driving voltage is applied to either grounded electrode 32 or additional electrode 36 to generate the desired signal.

It should be noted at this point that many variations and refinements may be made within the scope of the principles of the present invention. By way of example, it should be noted that receiver 20 may employ more than one sensing electrode 30 spaced around cylinder 22. This may be useful for a number of reasons. Firstly, by analyzing the detected signals separately and identifying phase differences between the signals, it is possible to derive approximate direction information from measurements at a single receiver. Alternatively, in an example in which the wavelength is short compared to the size of cylinder 22, it may be possible to chose the spacing of a number of commonly connected sensing electrodes to achieve inherent tuning of the receiver to frequencies of interest. In other words, if the spacing corresponds to in-phase spacing around cylinder for a given frequency, the signals from each sensing electrode will have the same sign and will add up to an increased amplitude. At many other frequencies, some degree of cancellation will occur as was described in the context of FIG. 2 above.

As mentioned earlier, cylinder 22 is preferably configured so that is supports only about a single wavelength of the vibration waves within the piezoelectric film induced by ultrasound signals at the working frequency. More specifically, half of the circumference ($\pi D/2$) is preferably equal to the wavelength of the vibration waves within the film. For this reason, the diameter of the cylinder is generally chosen to be inversely porportional to the intended working frequency. By way of example, for a working frequency of 90 kHz, a cylinder of diameter about 5 mm is generally preferred.

Turning now to FIGS. 12A–13B, it should be noted that the transceiver functionally of the transducers of the present invention are particularly useful for implementing a self-calibration mode according to another aspect of the present invention which offers increased precision and reliability in a system for determining the position of a movable element.

By way of introduction, it should be noted that ultrasound time-of-flight based digitizer systems suffer from problems of accuracy due to significant variations in the speed of sound through air which result from changes in temperature, pressure or humidity. In order to compensate for such variations, the present aspect of the present invention provides a self-calibration facility which will now be described.

Figure 12A:
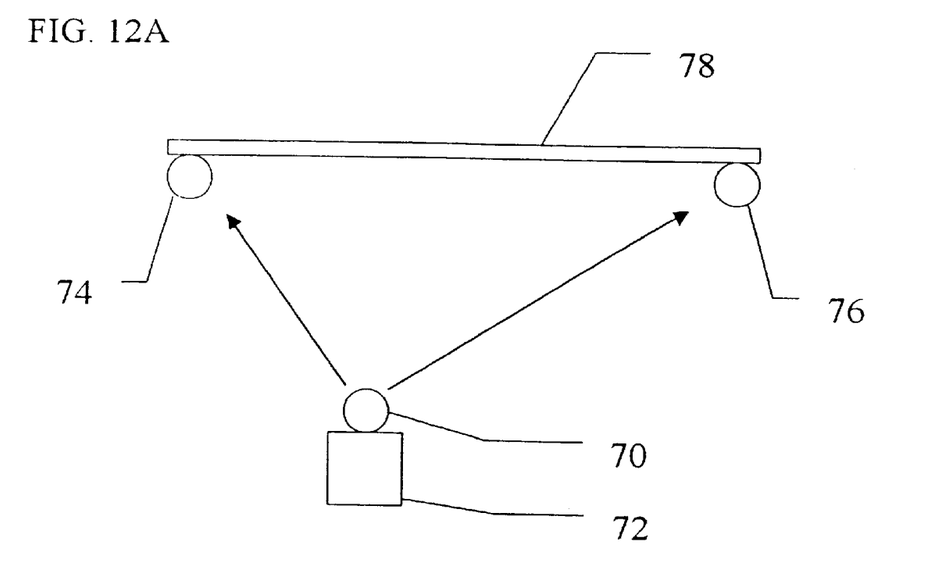
FIG. 12A is a schematic representation of the operation of a system for determining the position of a movable element, constructed and operative according to the teachings of the present invention, operating in a primary mode of operation.

Turning first to FIG. 12A, there is shown schematically a system for determining the position of a movable element, including a movable ultrasound transducer 70 associated with a movable element 72 and at least two ultrasound transducers 74, 76 maintained in fixed geometrical relation by attachment to a base unit 78. In the case illustrated here, the normal measurement mode of the system includes transmitting at least one measurement signal from movable ultrasound transducer 70 which is received by fixed ultrsound transducers 74 and 76. A position of movable element 72 is then derived using time-of-flight measurements for the ultrasound measurement signal.

Figure 12B:
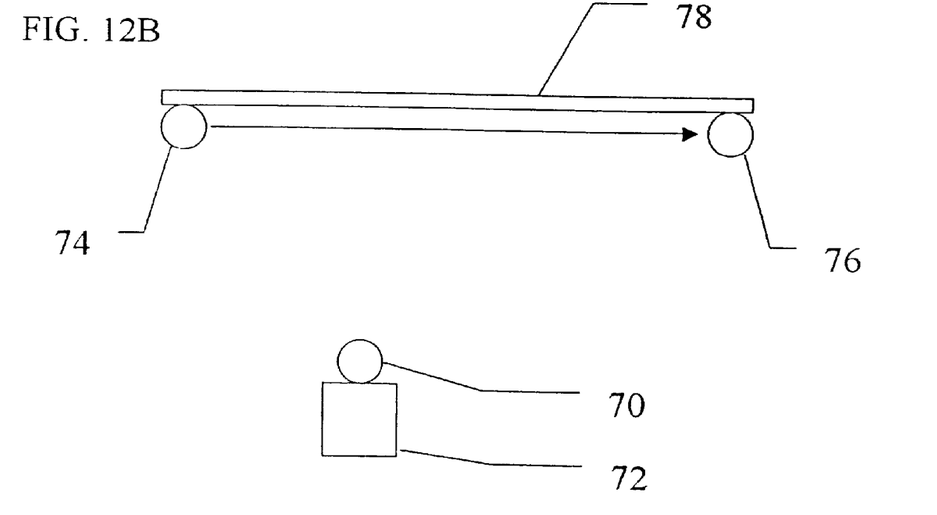
FIG. 12B is a schematic respesentation of the operation of the system of FIG. 12A while performing a self-calibration operation.

According to the teachings of the present invention, the system is also intermittently operated in a calibration mode in which transducer 74 switches from its normal receiving function to transmitting, sending out a calibration signal which is received by transducer 76. Since the distance between transducers 74 and 76 is a fixed value defined by the structure of base unit 78, time-of-flight measurments for the calibration signal can be used to derive calibration information indicative of variations in the speed of sound in the enviroment within which the system is currently operating. This calibration information is then used to correct the derivation of the position of movable element 72.

Figure 13A:
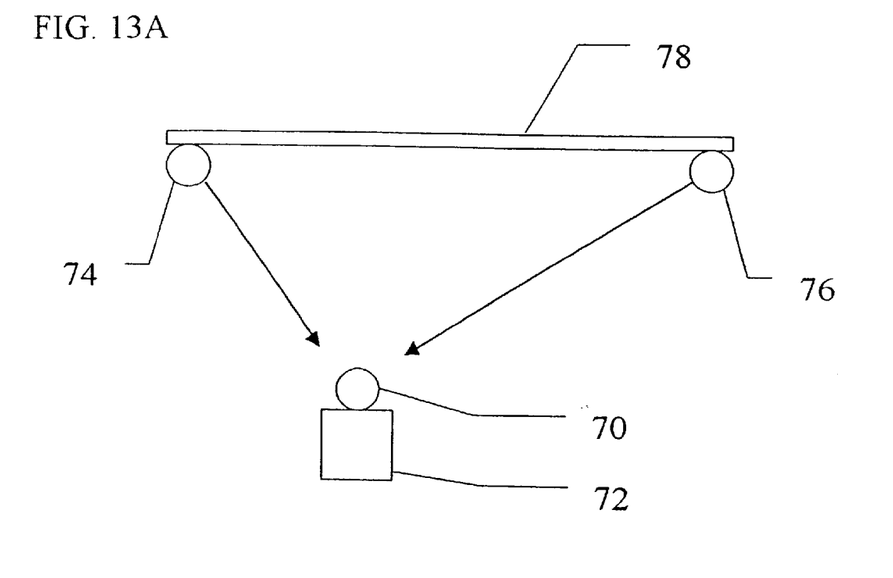
FIG. 13A is a schematic representation of the operation of an alternative system for determining the position of a movable element, constructed and operative according to the teachings of the present invention, operating in a primary mode of operation.
Figure 13B:
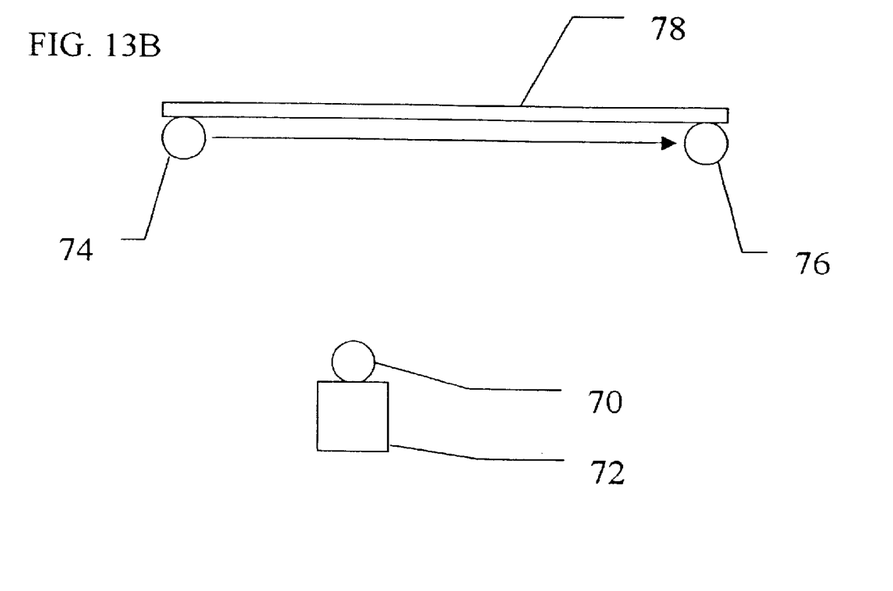
FIG. 13B is a schematic respresentation of the operation of the system of FIG. 13A while performing a self-calibration operation.

Referring briefly to FIGS. 13A and 13B, these illustrate an implementation of this aspect of the present invention for a system where movable transducer 70 functions as a receiver for receiving signals transmitted by fixed transducers 74 and 76. In this case, the calibration mode is implemented by momentarily emplying transducer 76 as a receiver to receive a calibration signal trnasmitted by transducer 74. In all other respects, the principles of the invention remain as before.

Figure 14:
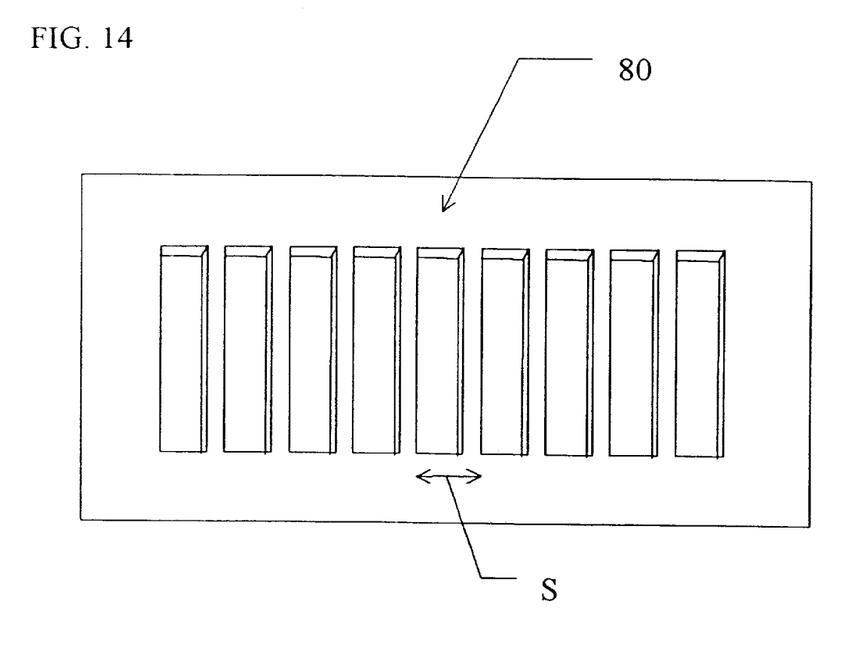
FIG. 14 is a schematic isomatic view of a protective grating, constructed and operative according to the teachings of the present invention, for use with ultrasound transducers.

Turning now to FIG. 14, there is shown a protective grating, generally designated 80, constructed and operative according to the teachings of a further aspect of the present invention, for use to provide mechanical protection for an ultrasound transducer.

Mechancial protection must often be provided for transducers, particularly those using piezoelectric films which are easily damaged. Many existing transducer structures suffer from significant signal distortion and/or "blind spots" (i.e., directions in which transmitted intensity or sensitivity of reception are significantly impaired) due to the presence of various protective structures in front of the transducer.

To minimize or eliminate such problems, the present invention provides a protective grating structure 80 in which a periodic pattern of openings has a spatial period S of no more than $\lambda/2$, and preferably no more than 80/4, where $\lambda$ is the wavelength of the ultrasound working frequency in air. By using a grating with a grating step S significantly smaller than existing systems, little or no directional disruption is caused to the ultrasound signals. By way of a practical example, for a working frequency of 90 kHz, corresponding to a wavelength in air of about 4 mm, a grating step of 1.9 mm has been found to offer minimal disruption to the transmission and reception of signals.

To minimize attenuation of the signal, the proportion of the grating which is open is preferably maximized, subject to the mechanical requirements for the structure. In the aforementioned example, the open area of the grating is preferably at least about 70% of the total area within each frating step.

Although shown here schematically in the form of a rectangular grating, grating 80 may clearly be implemented in a range of different forms to suit each particular application. Thus for a cylindrical transducer, such as those described above, grating 80 is preferably implemented as a cylindrical outer sleeve having openings with periodic spacing S.

Specifically for trnasducers associated with the writing point of a writing implement, it should be noted that all components of transducer 20 and grating 80 are preferably implemented as substantially transparent elements (using transparent conductive material for the electrodes and transparent plastics or the like grating 80) to the extent that the ultrasound transducer can be located very close to, and surround, the writing tip without obscuring the user's view of the tip.

It will be appreciated that the above descriptions are intended only to serve as examples, and that many other embodiments are possible within the spirit and the scope of the present invention.

What is claimed is:

1. An ultrasound receiver comprising:
   (a) a hollow cylinder formed primarily from flexible piezoelectric film, said hollow cylinder having an outer surface, an inner surface, a central axis and a height measured parallel to said central axis;
   (b) a sensing electrode formed from conductive material applied to said inner surface;
   (c) a grounded electrode formed from conductive material applied to said outer surface; and
   (d) a support structure for supporting said hollow cylinder, said support structure being configured to support said hollow cylinder in such a manner as to allow propagation of virbration waves circumferentially around a major part of said hollow cylinder,
   wherein said sensing electrode is formed as a strip extending in an extensional direction substantially parallel to said central axis along a major part of said height, said strip subtending at said central axis an angle of not more than 90°.

2. The ultrasound receiver of claim 1, wherein said strip subtends at said central axis and angle of not more than 30°.

3. The ultrasound receiver of claim 1, wherein the grounded electrode extends over a major part of said outer surface.

4. The ultrasound receiver of claim 3, further comprising at least one additional electrode formed from conductive material to said inner surface in a pattern non-contiguous with said sensing electrode.

5. The ultrasound receiver of claim 4, wherein said least one additional electrode extends over a major part of said inner surface.

6. The ultrasounf receiver of claim 5, wherein said at least one additional electrode is grounded.

7. The ultrasound receiver of claim 5, configured for use additionally as an ultrasound transmitter, thereby serving as an ultrasound transceiver, the ultrasound transceiver further comprising a control module including:
   (a) receiver circuitry electrically connected to said sensing electrode;
   (b) transmitter circuitry; and
   (c) a switching system associated with an actuating electrode selected from said grounded electrode and said additional electrode and configured to alternately electrically connect said actuating electrode to said transmitter circuitry and to ground.

8. The ultrasound receiver of claim 1, wherein said support structure includes a conductive core element deployed within said hollow cylinder in such a manner as to avoid electrical contact with said sensing electrode, said conductive core element being electrically grounded.

9. The ultrasound receiver of claim 8, wherein said conductive core element is a metal core element.

10. The ultrasound receiver of claim 8, wherein said conductive core element is formed from conductive foam.

11. The ultrasound receiver of claim 1, wherein said flexible piezoelectric film is implemented as PVDF film.

12. The ultrasound receiver of claim 1, wherein said sensing electrode and said grounded electrode are implemented as substantially transparent electrodes.

13. A method for operating an ultrasound transceiver for receiving and transmitting ultrasound signals, the method comprising the steps of:
   (a) providing an ultrasound transceiver structure including:
      (i) a hollow cylinder formed primarily from flexible piezoelectric film, said hollow cylinder having an outer surface, an inner surface, a central axis and a height measured parallel to said central axis, said hollow cylinder being mounted so as to allow propagation of vibration waves circumferentially around a major part of said hollow cylinder, (ii) a sensing electrode formed from conductive material applied to said inner surface, said sensing electrode being formed as a narrow strip extending in an extensional direction substantially parallel to said central axis along a major part of said height, said strip subtending at said central axis an angle of not more than 90°, (iii) at least one additional inner electrode formed from conductive material applied so as to extend over a major part of said inner surface in a pattern non-contiguous with said sensing electrode, and (iv) at least one outer electrode formed from conductive material applied so as to extend over a major part of said outer surface;

(b) receiving ultrasound signals by:
  (i) connecting both said additional inner electrode and said outer electrode to ground, and
  (ii) electrically connecting said sensing electrode to receiver circuitry; and (c) transmitting ultrasound signals by appying a driving voltage to at least one of said additional inner electrode and said outer electrode.

14. A method for operating a system for determining the position of a movable element, the system including a first group of movable ultrasound transducers including at least one ultrasound transducer associated with a movable element and a second group of fixed ultrasound tranducers including at least two ultrasound transducers maintained in fixed geometrical relation by attachment to a base unit, the method for operating including:

(a) operating the system in a measurement mode in which:
  (i) one of said first and second groups of ultrasound transducers transmits at least one measurement signal which is received by ultrasound transducers in the other of said first and second groups, and (ii) a position of the movable element is derived from time-of-flight measurements for said at least one measurement signal; and (b) intermittently operating the system in a calibration mode in which:
  (i) at least one ultrasound transducer from said second group transmits a calibration signal and at least one other ultrasound transducer from said second group receives said calibration signal, and
  (ii) calibration information is derived from time-of-flight measurements for said calibration signal.

15. The method of claim 14, wherein at least one ultrasound transducer from said second group is formed with a structure including:

(a) a hollow cylinder formed primarily from flexible piezoelectric film, said hollow cylinder having an outer surface, an inner surface, a central axis and a height measured parallel to said central axis, said hollow cylinder being mounted so as to allow propagation of vibration waves circumferentially around a major part of said hollow cylinder;

(b) a sensing electrode formed from conductive material applied to said inner surface, said sensing electrode being formed as a narrow strip extending in an extensional direction substantially parallel to csaid central axis along a major part of said height, said strip subtending at said central axis an angle of not more than 90°, (c) at least one additional inner electrode formed from conductive material applied so as to extend over a major part of said inner surface in a pattern non-contiguous with said sensing electrode; and (d) at least one outer electrode formed from conductive material applied so as to extend over a major part of said outer surface.

16. A method for providing mechanical protection for an ultrasound transducer used for given frequency of ultrasound signals while minimizing interference with the ultrasound signals, the method comprising positioning a protective grating adjacent to the transducer, the grating gaving a plurality of openings spaced at a spatial frequency of less than about half of the wavelength of the given frequency of ultrasound in air.

17. The method of claim 16, wherein the grating has a plurality of openings spaced at a spatial frequency of less than about a quarter of the wavelength of the given frequency of ultrasound in air.

18. The method of claim 16, wherein the transducer is a cylindrical transducer, the grating being configured as a cylindrical grating surrouding the transducer.

* * * * *

UNITED STATES PATENT AND TRADEMARK OFFICE
CERTIFICATE OF CORRECTION

PATENT NO. : 6,392,330 B1
DATED : May 21, 2002
INVENTOR(S) : Zloter et al.

It is certified that error appears in the above-identified patent and that said Letters Patent is hereby corrected as shown below:

Column 10,
Line 28, insert the word -- ultrasound -- and delete "ultrasounf"

Signed and Sealed this

Thirtieth Day of July, 2002

Attest:

Attesting Officer

JAMES E. ROGAN
Director of the United States Patent and Trademark Office